Figure 1:
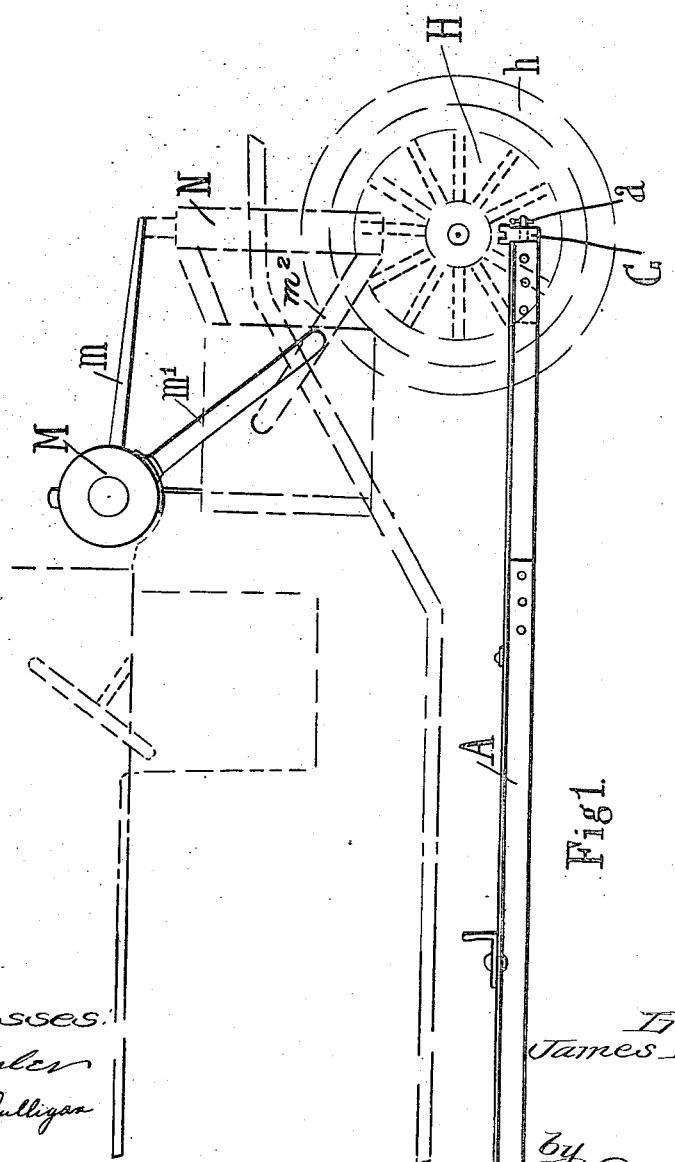

J. HODGSON.
ATTACHMENT FOR CONVERTING MOTOR DRIVEN CHASSIS INTO TRACTORS FOR AGRICULTURAL PURPOSES.
APPLICATION FILED MAR. 8, 1918.

1,422,709.
Patented July 11, 1922.

Witnesses
Inventor
James Hodgson

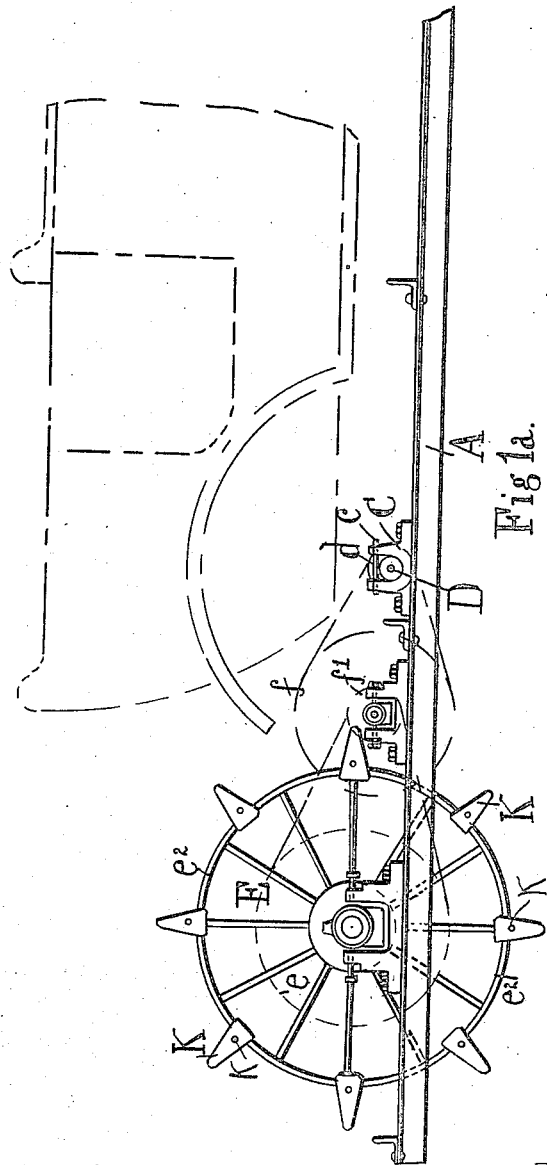

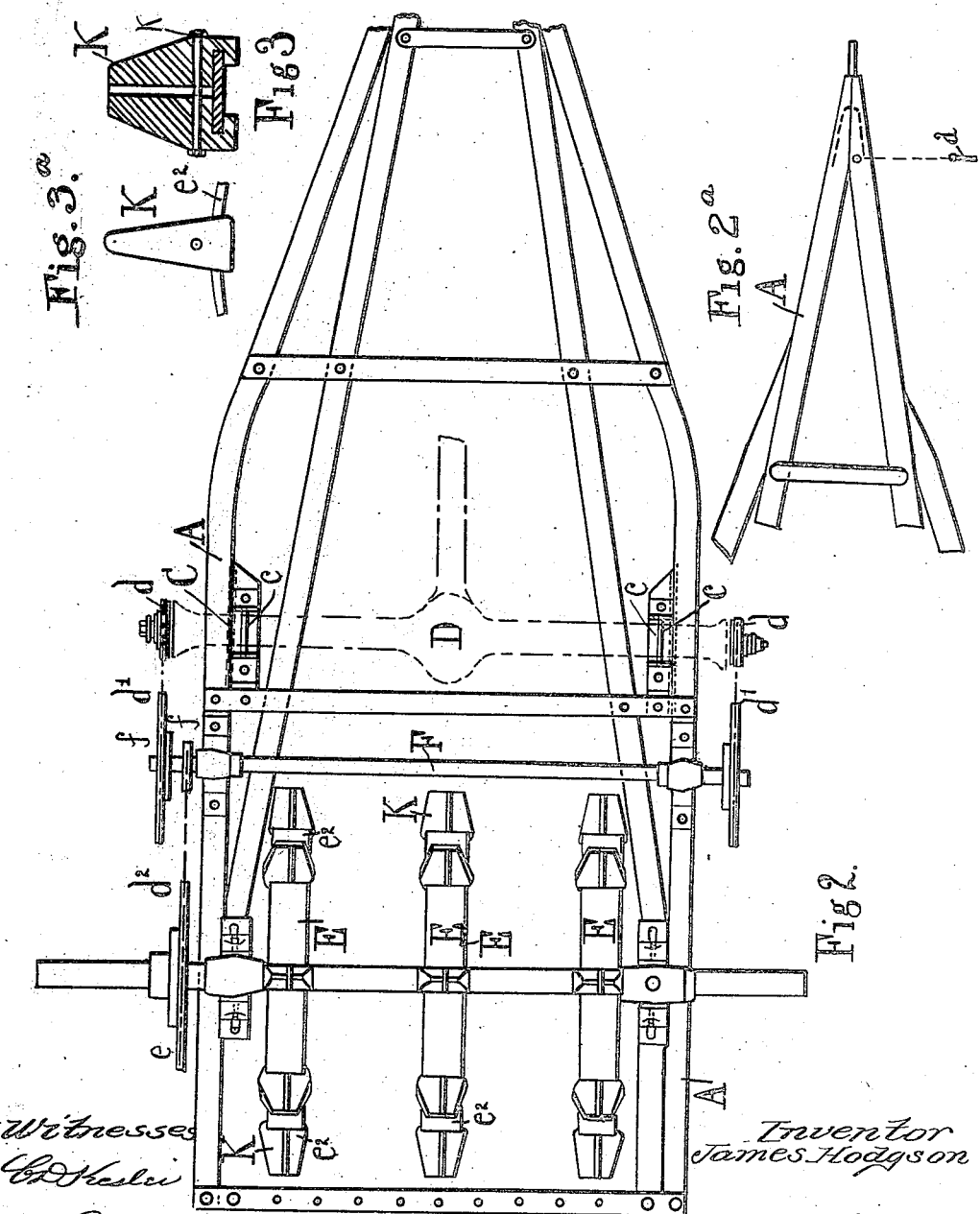

UNITED STATES PATENT OFFICE.

JAMES HODGSON, OF CARLISLE, ENGLAND.

ATTACHMENT FOR CONVERTING MOTOR-DRIVEN CHASSIS INTO TRACTORS FOR AGRICULTURAL PURPOSES.

1,422,709. Specification of Letters Patent. Patented July 11, 1922.

Application filed March 8, 1918. Serial No. 221,280.

*To all whom it may concern:*

Be it known that I, JAMES HODGSON, a British subject, residing at Carlisle, county of Cumberland, England, have invented certain news and useful Improvements in Attachments for Converting Motor-Driven Chassis into Tractors for Agricultural Purposes, of which the following is a specification.

The invention relates to an attachment to convert any type of motor driven chassis into a tractor for agricultural purposes, in which an underslung frame is constructed to fit under the chassis beneath the rear axle and consists in mounting in the rear of the auxiliary frame a centrally placed tractor wheel to engage soft ground with chain or gear wheels on both ends of the tractor wheel axle by which to drive it from the rear axle of the primary chassis eliminating the differential action and in the construction of front wheels with flat tyres attached by blocks fitted into the arms of the wheels; and in the particular construction of the tractor wheels and in the radiator to carry an additional supply of water as hereinafter more fully set forth.

The invention will be fully described with reference to the accompanying drawings.

Figure 1 is a side elevation of the front end of the tractor attachment.

Figure 1ª is a similar view of the rear end.

Fig. 2 is a plan of same, with the front end broken away.

Figure 2ª is a plan view of the extreme front portion.

Fig. 3 shows in transverse cross section a detail of the tractor wheel blades, and Figure 3ª is a view in side elevation of the same detail, the details of construction of the tractor wheels.

A tractor frame or chassis A is constructed to fit under the ordinary frame or chassis of a motor vehicle. The frame or chassis A is constructed with bearings or sockets C at both sides into which the rear axle D of the motor vehicle fits. These bearings are preferably open at top with a bolt $c$ passed through from side to side above the axle or of any other convenient shape or construction to embrace the rear axle D. The bearings C may be permanently fixed for one particular make of vehicle or they may be adjustable on the frame A to suit various makes of vehicles. The auxiliary tractor frame A at its rear end is mounted upon a centrally placed tractor wheel E within or between the members of the chassis the axle of the tractor wheel E being fitted with sprocket wheels $e$. The chassis A also carries an intermediate or counter shaft F fitted with sprocket wheels $f$ $f'$ at both ends. To the rear axle D of the ordinary motor vehicle in substitution for the road wheels two sprocket wheels $d$ are fitted. The centrally placed tractor wheel E is driven from the rear axle D at one or both ends through the wheels $d$, $e$, $f$, $f'$ and counter shaft F by chains $d'$ $d^2$ thereby eliminating the differential action of the rear axle D. Instead however, of the chains toothed gear wheels may be employed.

The tractor chassis or frame A is fitted at its fore end with a pin or pivot $a$ which enters a hole or socket in or attached to the front axle G of the motor vehicle. Thus a swivelling three point suspension is obtained which will ensure level movement.

The tractor wheel E is built up of one, two or more hoops or rims $e^2$ keyed or otherwise affixed to the axle $e'$ and spaced according to size. Upon each rim $e^2$ a number of gripping blades or blocks K are mounted at intervals around the periphery to enter the soft ground as the wheel rotates. Each blade or block K is made in two parts tapering from the base outwards and on the inner side at or near the base is formed with a groove or channel to engage the edge of the rim $e^2$. The two parts of the block K are clamped together and secured in position upon the rim by a bolt $k$ passed through them transversely by which they are securely clamped to the rim. To prevent movement of the blocks K thereon the rim $e^2$ may be notched on its edges and a corresponding projection or pin on the block K will fit therein or holes or slots may be made in the periphery of the rim $e^2$ for the same purpose.

By slacking the clamping bolt $k$ the blocks or blades K may be readily removed and replaced or their position adjusted. The number around each rim or wheel may be more or less according to the nature of the ground they are intended to traverse.

For traversing hard roads the blocks K may be removed from the rims $e^2$ or additional road wheels may be placed on the ends of the axle e' of greater diameter than the rims e² with their blocks attached.

To ensure the efficient cooling of the cylinders of the vehicle when employed on heavy agricultural work an additional or auxiliary tank M to hold an extra supply of water is fitted to the dash of the vehicle and is connected by a flat member or tubes m to the top of the radiator N. The member m may be formed of two thin sheets of metal and take the place of the bonnet or cover of the motor. The lower portion of the tank M is connected by a pipe m' with the return pipe m² of the radiator or with the pipe from the top of the cylinder jacket.

To attach the tractor to a vehicle the rear wheels are removed from the rear axle D and the tractor frame A passed below the axle D until the latter fits or drops into the sockets or bearings C. The sprocket wheels d are fitted on to the rear axle and the gear chains d' placed in position. The front pin a of the tractor frame is shackled to the front axle G and the tyres of the front wheels are changed. The vehicle is then ready for use as a tractor for agricultural work.

What I claim as my invention and desire to protect by Letters Patent is:—

1. An attachment for converting a motor driven vehicle having an axle provided with a differential into a tractor for agricultural purposes, comprising an auxiliary frame to fit beneath the vehicle chassis, bearings thereon to receive the rear axle of the vehicle, a centrally placed tractor wheel at the rear of said auxiliary frame upon which said frame is supported, means connected to both ends of the rear axle of the vehicle for locking the differential and a driving connection from said vehicle axle to said tractor wheel.

2. An attachment for converting a motor driven vehicle having an axle provided with a differential into a tractor for agricultural purposes, comprising an auxiliary frame to fit beneath the vehicle chassis, bearings thereon to receive the rear axle of the vehicle, a centrally placed tractor wheel at the rear of said auxiliary frame carried within said frame upon which said frame is supported, means connected to both ends of the rear axle of the vehicle for locking the differential and a driving connection from said vehicle axle to said tractor wheel.

3. An attachment for converting a motor driven vehicle having an axle provided with a differential into a tractor for agricultural purposes, comprising an auxiliary frame to fit beneath the vehicle chassis, bearings thereon to recive the rear axle of the vehicle, a centrally placed tractor wheel at the rear of said auxiliary frame carried within said frame upon which said frame is supported, a rigid shaft having a driving connection with each end of the axle of the vehicle for locking said differential and a driving connection from said shaft to the tractor wheel.

In testimony whereof I have hereunto set my hand in presence of two subscribing witnesses.

JAMES HODGSON.

Witnesses:
I. H. MAWTON,
HENRY BROCKBANK.